United States Patent
Prohofsky (10) Patent No.: US 11,307,980 B2
(45) Date of Patent: Apr. 19, 2022

(54) DISTRIBUTED DATA STORAGE SYSTEM WITH PASSTHROUGH OPERATIONS

(71) Applicant: Seagate Technology LLC, Cupertino, CA (US)

(72) Inventor: Thomas R. Prohofsky, Edina, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 421 days.

(21) Appl. No.: 15/958,621

(22) Filed: Apr. 20, 2018

(65) Prior Publication Data

US 2019/0324898 A1 Oct. 24, 2019

(51) Int. Cl.
*G06F 3/06* (2006.01)
*G06F 12/02* (2006.01)
*G06F 9/52* (2006.01)
*G06F 9/48* (2006.01)
*H04L 67/1097* (2022.01)
*G06F 13/42* (2006.01)

(52) U.S. Cl.
CPC ........ *G06F 12/0246* (2013.01); *G06F 3/0604* (2013.01); *G06F 3/0622* (2013.01); *G06F 3/0658* (2013.01); *G06F 3/0665* (2013.01); *G06F 9/4881* (2013.01); *G06F 9/526* (2013.01); *G06F 12/0253* (2013.01); *G06F 13/4221* (2013.01); *H04L 67/1097* (2013.01); *G06F 2212/7202* (2013.01); *G06F 2212/7205* (2013.01); *G06F 2212/7211* (2013.01); *G06F 2213/0026* (2013.01)

(58) Field of Classification Search
CPC .... G06F 3/0604; G06F 3/0622; G06F 3/0665; G06F 3/0658; G06F 12/0253
See application file for complete search history.

(56) References Cited

U.S. PATENT DOCUMENTS

| | | | |
|---|---|---|---|
| 8,495,356 B2 | 7/2013 | Ashok et al. | |
| 8,594,835 B2 | 11/2013 | Lert et al. | |
| 9,158,567 B2 | 10/2015 | Chawla et al. | |
| 9,256,467 B1 | 2/2016 | Singh et al. | |
| 9,292,219 B2 | 3/2016 | Oiwa | |
| 9,569,180 B1 | 2/2017 | Jiang et al. | |

(Continued)

FOREIGN PATENT DOCUMENTS

| CN | 105069353 A | 11/2015 |
|---|---|---|
| KR | 20170067118 A | 6/2017 |

OTHER PUBLICATIONS

Delkin, Delkin Device Blog, NAND Flash Based SSD Drives and the Flash Controller, Nov. 13, 2017 (Year: 2017).*

(Continued)

*Primary Examiner* — Arpan P. Savla
*Assistant Examiner* — Edmund H Kwong
(74) *Attorney, Agent, or Firm* — Hall Estill Law Firm (57) ABSTRACT

A distributed data storage system can have a plurality of data storage devices connected to a host via a network controller. Receipt of a data access request from the host with the network controller can result in passing the data access request to a predetermined data storage device of the plurality of data storage devices with the network controller without processing the data access request. The data access request may then be satisfied with a device controller of the predetermined data storage device.

19 Claims, 5 Drawing Sheets

(56) References Cited

U.S. PATENT DOCUMENTS

| | | | |
|---|---|---|---|
| 9,785,361 B1* | 10/2017 | Maroney | G06F 3/0619 |
| 2010/0031258 A1 | 2/2010 | Takano et al. | |
| 2013/0055284 A1* | 2/2013 | Sabato | G06F 9/526 |
| | | | 718/106 |
| 2013/0311295 A1 | 11/2013 | Belby et al. | |
| 2014/0007087 A1 | 1/2014 | Scott-Nash et al. | |
| 2014/0108639 A1 | 4/2014 | Nelke et al. | |
| 2016/0034809 A1 | 2/2016 | Trenholm et al. | |
| 2016/0100027 A1* | 4/2016 | Haghighi | H04L 67/1097 |
| | | | 709/214 |
| 2016/0182549 A1 | 6/2016 | Bachar et al. | |
| 2017/0052807 A1 | 2/2017 | Kristiansson et al. | |
| 2017/0060613 A1 | 3/2017 | Warkentin et al. | |
| 2017/0063968 A1 | 3/2017 | Kitchen et al. | |
| 2017/0201490 A1 | 7/2017 | Kinder et al. | |
| 2017/0351457 A1* | 12/2017 | Usui | G06F 3/061 |
| 2017/0372173 A1 | 12/2017 | Kairali et al. | |
| 2018/0006886 A1 | 1/2018 | Dhanakshirur et al. | |
| 2018/0260213 A1* | 9/2018 | Yamaguchi | G06F 8/64 |
| 2018/0270119 A1* | 9/2018 | Ballapuram | H04L 41/12 |
| 2018/0335961 A1* | 11/2018 | Colline | G06F 3/061 |

OTHER PUBLICATIONS

DeJean, David and George Sprott, Server Connections: Just passing thru, IBM Developerworks, Jan. 15, 1998. https://www.ibm.com/developerworks/lotus/library/ls-Just_passing_thru/index.html (Year: 1998).*

Jang, Saqib, SNIA NSF on Networking storage, Comparing iSCSI, iSER, and NVMe over Fabrics (NVMe-oF): Ecosystem, Interoperability, Performance, and Use Cases, Aug. 17, 2017. (Year: 2017).*

* cited by examiner

DISTRIBUTED DATA STORAGE SYSTEM WITH PASSTHROUGH OPERATIONS

SUMMARY OF THE INVENTION

In accordance with some embodiments, a distributed data storage system consists of a plurality of data storage devices connected to a host via a network controller. Receipt of a data access request from the host by the network controller results in passing the data access request to a predetermined data storage device of the plurality of data storage devices with the network controller without processing the data access request. The data access request is then satisfied with a device controller of the predetermined data storage device.

Various embodiments arrange a distributed data storage system as a plurality of data storage devices connected to a host via a first network controller with the first network controller configured to pass a data access request from the host to a predetermined data storage device of the plurality of data storage devices without processing the data access request.

In other embodiments, a distributed data storage system has a plurality of data storage devices connected to a host via a network controller. Receipt of a first data access request from a first host and a second data access from a second host by the network controller results in passing the respective data access requests to a predetermined data storage device of the plurality of data storage devices with the network controller without processing the respective data access requests. Each data access request is then satisfied with a device controller of the predetermined data storage device after executing multithreading barrier request to the mutually exclusion object within to data storage device (in-drive mutex) on the respective data access requests.

DETAILED DESCRIPTION

Various embodiments of the present disclosure are generally directed to a distributed data storage system that intelligently passes host requests and/or system operations through network-level components to one or more data storage devices for at least data storage configurations, policy activity, and servicing of data accesses.

Increasing demand for data storage available to mobile computing devices, such as laptop computers, tablet computers, smartphones, and other data generating electronics, has resulted in aggregations of multiple data storage devices. Sophisticated wired and wireless communications capabilities have emphasized the data capacity, reliability, and speed of remote data storage aggregations. Hence, distributed data storage systems have been developed that can provide data storage to a mobile computing device with increased security and minimal practical data access latency.

However, greater numbers of data access requests from multiple different hosts can degrade the performance in which a distributed data storage system can service a data access request. The use of memory that has a limited service life further complicates a data storage system's ability to fulfill performance potential due to service operations on data not being accessed by a host. Accordingly, assorted embodiments bypass network-level components in a distributed data storage system to allow one or more data storage devices to configure, schedule, and execute data storage operations and the servicing of host data access requests.

Figure 1:
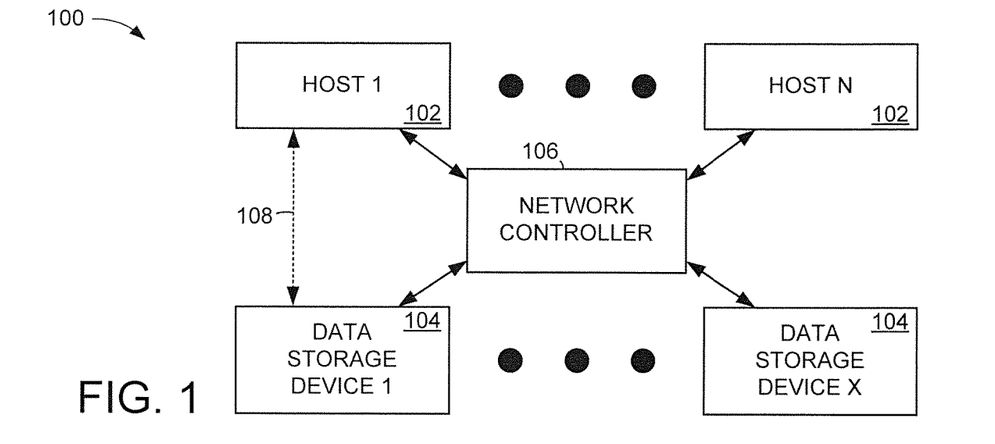
FIG. 1 is a block representation of a portion of an example distributed data storage system arranged in accordance with various embodiments.

An example distributed data storage system 100 is shown as a block representation in FIG. 1. The system 100 can have any number (N) of remote hosts 102, such as computing devices, network nodes, or other source of data access requests. A number (X) of data storage devices 104 can be aggregated to provide a greater data capacity than any single device 104. A network controller 106, such as a server, switch, router, or node, can be logically disposed between the remote hosts 102 and the respective data storage devices 104 to provide data storage management for the system 100.

It is contemplated that the network controller 106 is circuitry configured to organize data stored in the respective data storage devices 104 in a manner that allows for efficient retrieval upon host request. While a host 102 may directly access a data storage device 104 without connection to the network controller 106, as shown by segmented line 108, such connection is limited in bandwidth and data capacity while jeopardizing the operational integrity of the data storage device 104 due to conflicting host requests and formats from the connected network controller 106. Thus, various embodiments arrange a distributed data storage system 100 with each remote host 102 connected to the respective data storage devices 104 only via network-level components like the network controller 106.

Figure 2:
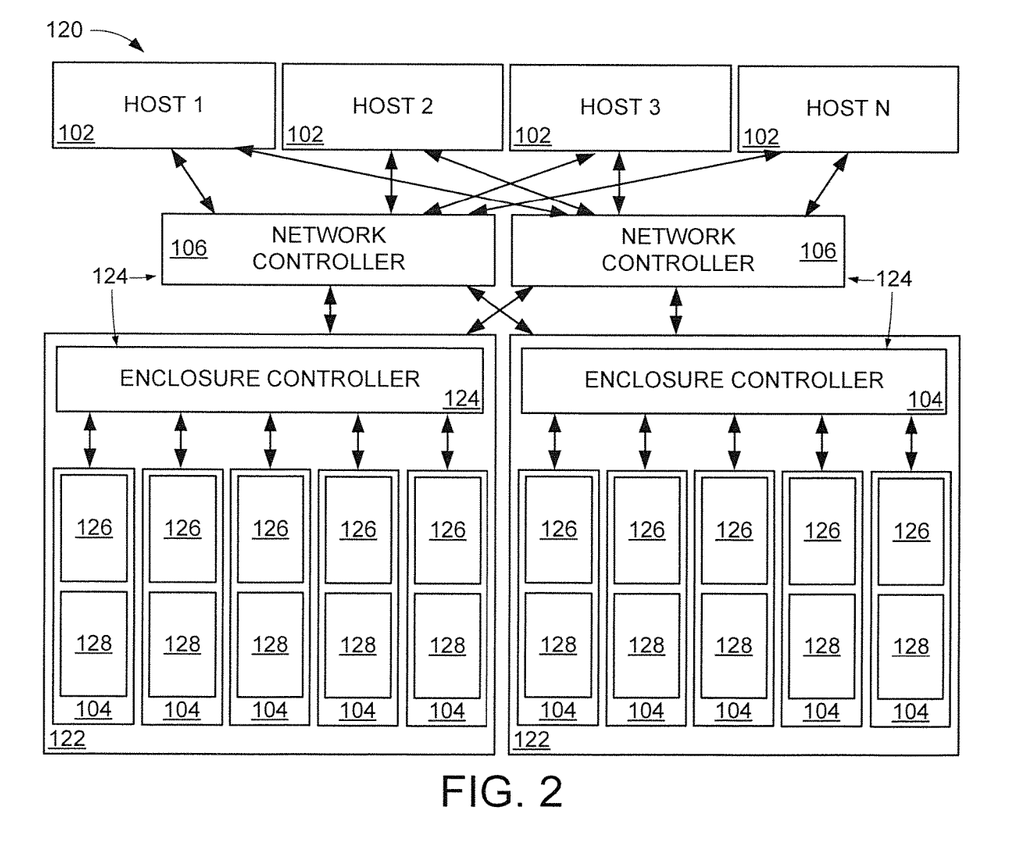
FIG. 2 displays a block representation of an example distributed data storage system configured in accordance with some embodiments.

The operation of a network controller 106 to organize, schedule, and execute data storage operations along with data access requests can be efficient in some environments where relatively low volumes of data access requests are processed concurrently and over time. FIG. 2 depicts a block representation of an example distributed data storage system 120 that can provide higher data storage performance for greater volumes of data access requests than the system 100 of FIG. 1. The system 120 has a plurality of remote hosts 102 that can be physically located at separate locations, such as different cities, countries, and hemispheres.

The various hosts 102 are connected to a plurality of data storage devices 104 via multiple network controllers 106, although a single network controller 106 may be utilized. The network controllers 106 can choreograph, schedule, and execute any number of data accesses, such as data reads and data writes, to the respective data storage devices 104 along with any number of policy operations, such as provisioning, security, garbage collection, and wear mitigation. In this way, the data storage devices 104 are treated as "dummy" units that only carry out the instructions designated by a network controller 106.

Some embodiments utilize the assorted data storage devices 104 as intelligent contributors to the data storage system 120 by having the devices 104 choreograph, schedule, and execute at least policy operations on the respective devices 104. By having the data storage devices 104 be intelligent contributors, the processing capability, and bandwidth, of the network controllers 106 can be more efficiently utilized for data access operations or other operations assigned by the devices 104. That is, the data storage devices 104 may arrange and execute all data storage and policy operations with the network controllers 106 being distribution centers that simply carry out instructions generated by the devices 104.

The utilization of the data storage devices 104 as intelligent contributors takes advantage of the relatively high processing, bandwidth, and throughput capabilities of the devices 104 compared to the network controllers 106 to provide optimized data storage performance. Such relatively high capabilities of the respective data storage devices 104 can be contributed, at least partially, to advanced channel, bus, fabrics, and protocols that allow increased volumes of data to be moved more quickly than the network controllers 106 that are limited by the connections to multiple different hosts 102. For example, a data storage device 104 may have a peripheral component interconnect express (PCIe) bus employing a non-volatile memory express (NVMe) protocol, internet small computer systems interface (ISCSI) over Ethernet, NVMe over Infiniband, NVMe over Ethernet, and NVMe over OmniPath.

While not required or limiting, it is contemplated that multiple separate data storage devices 104 are connected within a common housing of a data storage enclosure 122. Multiple enclosures 122 can be efficiently physically accessed, powered, and cooled by being housed within a common rack. Housing multiple data storage devices 104 in a common enclosure 122 further allows one or more enclosure controller 124, such as a microprocessor or other programmable circuitry, that provides additional data distribution capabilities.

In yet, the addition of upstream controllers 124 can add complexity to the system 120 when data storage and policy operations are dictated by the network controller(s) 106. For instance, a data enclosure controller 124 can efficiently distribute data to the various data storage devices 102 of an enclosure 122, but can create a data throughput bottleneck when relatively large volumes of data, data request, and/or policy operations are being distributed, particularly when those activities are being transferred in opposite directions, such as downstream towards the data storage devices 104 and upstream towards the network controller 106. Thus, having the downstream data storage devices 104 dictating data storage and policy operations for the system 120 can utilize the distribution capabilities of an enclosure controller 124 without suffering from performance bottlenecks.

It is noted that a data storage device 104 of any type, capacity, and data transfer capability can be incorporated into the data storage system 120, but some embodiments configure each data storage device 104 with at least a device controller 126 and an associated data storage means 128 positioned within a common housing. The data storage means 128 may be any type of non-volatile memory, such as rotating magnetic media, solid-state memory, or a combination of the two. A data storage device 104 can comprise other electrical components in a common housing, such as a volatile memory buffer and interface bus.

Figure 3:
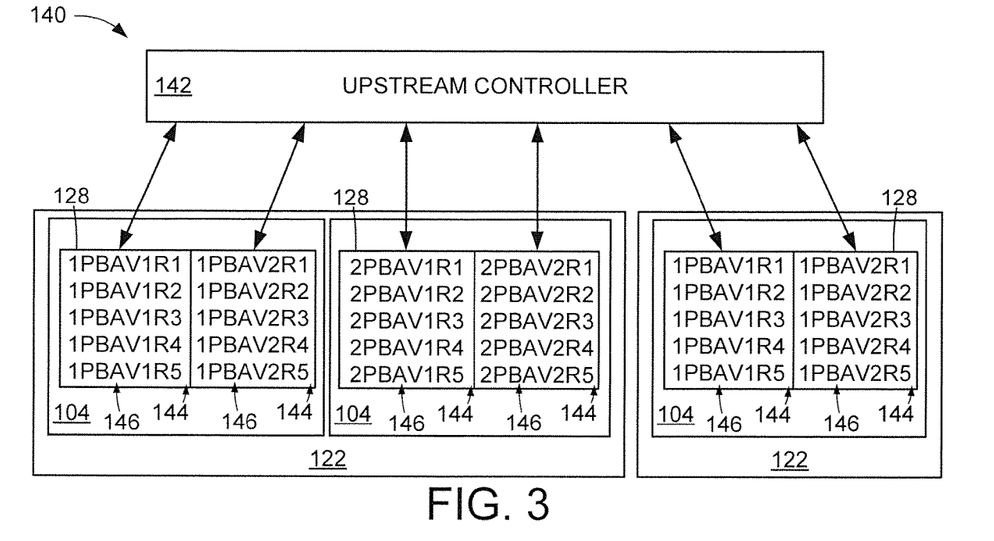
FIG. 3 shows a block representation of portions of an example distributed data storage system that may be employed in the systems of FIGS. 1 & 2.

FIG. 3 conveys a block representation of portions of an example data storage system 140 configured in accordance with various embodiments. An upstream controller 142, such as the device controller 126, network controller 106, and/or enclosure controller 124, can be connected to multiple data storage devices 104 that may, or may not, be arranged in physically separate enclosures 122. As shown, a data storage device 104 can be configured as a plurality of different logical volumes 144. It is noted that a data storage device 104 can have a common data capacity that is selectively separated in one or more logical volumes 144 by a controller.

The use of separate logical volumes 144 allows for the separation of data, software, firmware, and policies by the upstream controller 142 that can optimize data storage performance and security that can be altered, at will, to accommodate different storage demands and/or storage capabilities. For instance, logical volumes 144 can be initially be created to provide different virtual machines, data striping, data mirroring, and/or data update management before being changed by the controller 142 to accommodate new data storage performance metrics, such as error rate, access latency, or volume capacity.

The ability to alter the assorted logical volumes 144 of a data storage device 104 at will can provide a diverse range of capabilities to the upstream controller 142, and system 140, that would otherwise be difficult to satisfy. However, the logical division of a data storage device 104 can create increased amounts of processing and complexity to schedule and execute data storage accesses and policy operations. As a non-limiting example, simple data write requests from a host to a device 104 without logical volumes 144 would involve finding free space and performing a data write at the next convenient time, but the logical volume 144 configuration shown in FIG. 3 would result in a data write having to find a proper logical volume 144 that accommodates the write request's parameters while conforming to the policies of the logical volume 144.

Therefore, the use of logical volumes 144 can expand the capabilities of a data storage system 140, but can increase system complexity to the point of inhibiting data storage performance over time. It is noted that the logical volumes 144 shown in FIG. 3 have logical block addresses 146 that are assigned to physical block addresses of the storage means of the respective data storage devices 104. While not required or limiting, the logical block addresses 146 are labeled in FIG. 3 with respect to volume number and row number. For instance, 1PBAV1R1 represents data stored in the first logical volume and first row of the first data storage device 104 while 2PBAV3R4 represents data located at the third logical volume and fourth row of the second data storage device 104.

Figure 4:
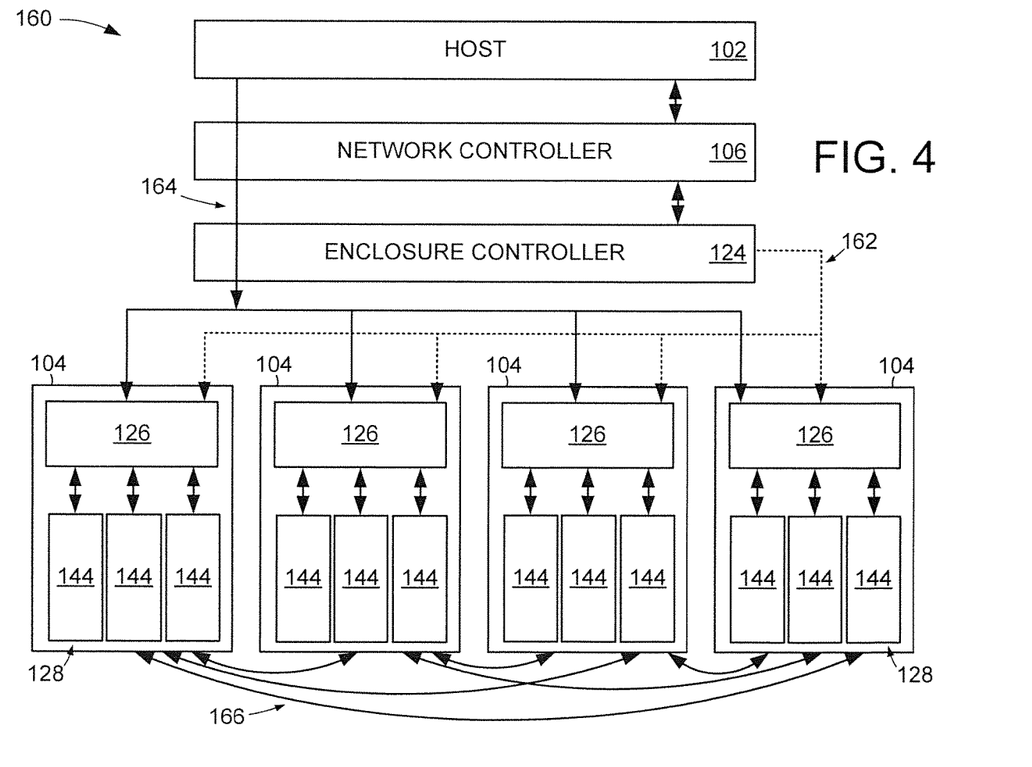
FIG. 4 illustrates a block representation of portions of an example distributed data storage system operated in accordance with various embodiments.

FIG. 4 displays a block representation of a portion of an example distributed data storage system 160 configured and operated in accordance with various embodiments to mitigate the degradation of data storage performance when numerous logical volumes 144 are present. One or more remote hosts 102 can be connected to a plurality of different data storage devices 104 that collectively provide a common data capacity by aggregating the constituent storage means 128.

Data access requests, such as data reads and data writes, from a host 102 can be processed by any system controller, such as the network controller 106, enclosure controller 124, and/or device controller 126, to correlate the request with data resident in the common data capacity as one or more logical block addresses, as shown by arrows 162. That is, a data access request can result in the controllers 106/124/126 individually, collectively, or redundantly, identifying a physical block address from the logical block address of the requested data, scheduling the retrieval or writing of the requested data, and executing the scheduled action to provide the host 102 with the data or a receipt of data being written.

Although each controller 106/124/126 is not required to act upon, modify, or otherwise process a data access request, each controller 106/124/126 does receive, read, and execute a portion a data access request. For instance, each controller 106/124/126 reads a data request processed by an upstream controller and at least proceeds to send the data request to the proper downstream controller, such as a single enclosure controller 124 of many different enclosures of the system 160 or a single data storage device 104 of many different devices 104 in an enclosure 122. The flow 162 of a data access request from host 102 to a logical volume 144 of a data storage device 104, and back is reliable and allows for portions of request processing, such as scheduling, correlating logical-to-physical addresses, or data striping, to be divided among different upstream controllers 106/124.

However, having multiple different controllers 106/124/126 each process data access requests can be slow due to the relatively small number of channels and signal throughput of the upstream controllers 106/124 compared with the number of data storage devices 104 and logical volumes 144 that can concurrently transfer data. The latency of the data access request flow 162 is further degraded when policy operations, such as garbage collection, addition of new logical volumes, removal of logical volumes, data striping, and encryption, are scheduled and directed by the upstream controller(s) 106/124. In other words, treating the respective data storage devices 104 as dummy components that merely execute commands, such as writing or retrieving data at a predetermined location, can be unnecessarily slow and fail to fulfill the potential of the data storage devices 104.

Accordingly, various embodiments are directed to bypassing at least one upstream controller 106/124 to allow individual data storage devices 104 to process, schedule, and execute system operations, such as data access requests and policy operations. As illustrated with arrow 164, a data access request from a remote host 102 passes through the network 106 and enclosure 124 controllers without those upstream controllers 106/124 conducting any data processing and, instead acting as "dummy" components that simply distribute a data access request to a predetermined data storage device 104. That is, the upstream controllers 106/124 do not act on a data access request or trigger any policy operations upon receipt of a data access request.

For example, a data access request can be preset to be distributed to a particular data storage device that has non-volatile storage means 128 where the request is temporarily stored while being processed by the device controller 126, which allows the upstream controllers 106/124 to freely distribute other data access requests without having to wait for the processing of a previous request. As a result, the superior bandwidth and channel capabilities of a data storage device 104 can bear the burden of data access computation, scheduling, and execution while upstream controllers 106/124 efficiently transfer pending and satisfied requests.

In some embodiments, data access requests are set to be received by a single data storage device 104 while other embodiments distribute consecutive requests to different sequential data storage devices 104 of an enclosure 122. Regardless of the distribution destination, the upstream controllers 106/124 are configured to merely pass a request to the preset destination with maximum speed and minimal time and processing expense. It is contemplated that the assorted data storage devices 104 can communicate, distribute data, satisfy data access requests, and conduct policy operations independently of the network controller 106, as shown by arrows 166. Such independent device activity may involve one or more enclosure controllers 124, but such involvement would be as a dummy component that simply passes signals, command, and/or data without engaging in processing, scheduling, or operation execution.

Figure 5:
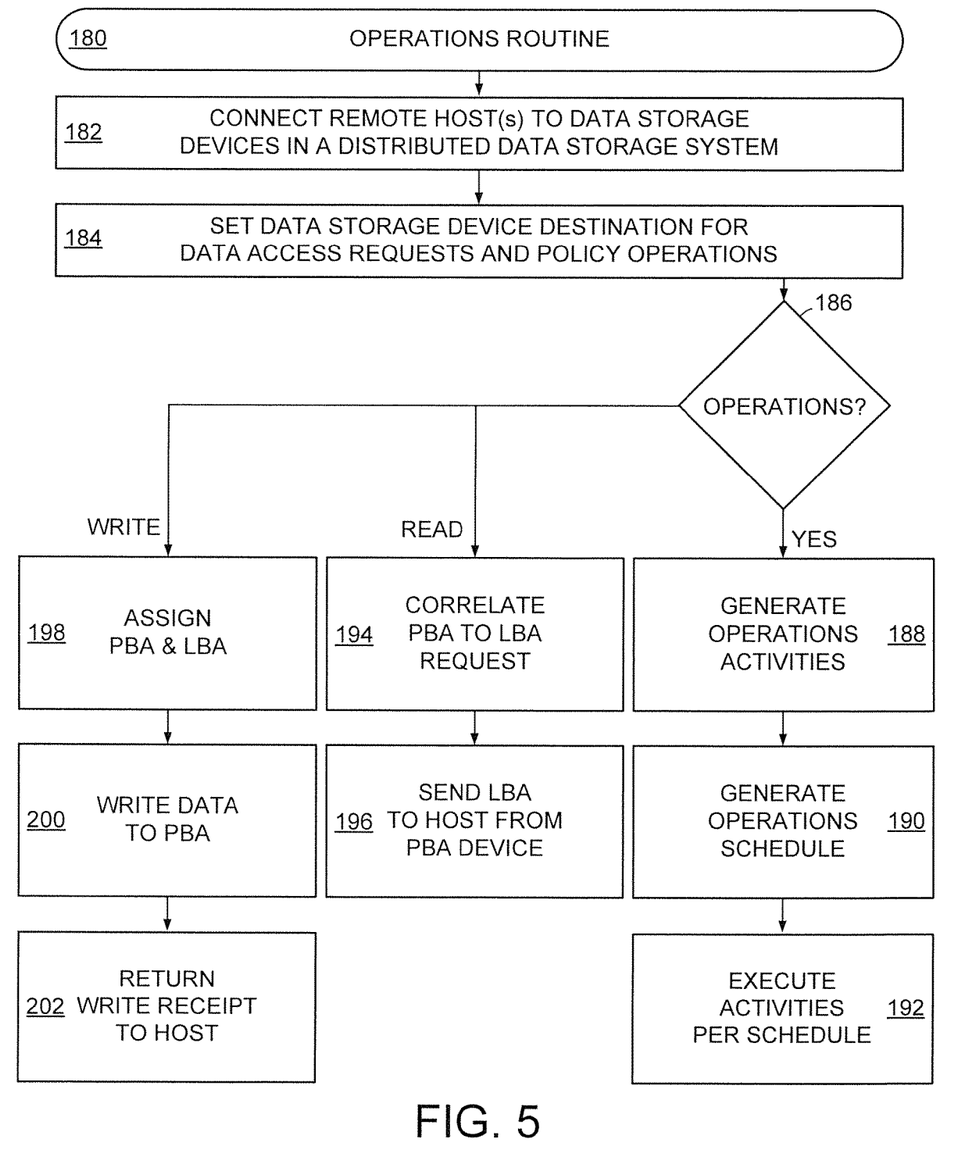
FIG. 5 provides an example operations routine that can be conducted with the assorted embodiments of FIGS. 1-4.

An example operations routine 180 that can be carried out by the assorted embodiments of FIGS. 1-4 is shown in FIG. 5. The routine 180 begins with at least one data storage device connected to one or more remote hosts via a network controller in step 182. It is contemplated that step 182 involves connecting multiple network controllers and/or data storage enclosures that house multiple data storage devices as part of a distributed data storage system where data storage is physically separated from the host, such as in different cities, states, countries, or hemispheres.

With the distributed data storage system connected and available for data storage operations, the destination data storage device(s) for data access requests and system policy operations are set in step 184. Such destination can be stored locally in the respective upstream system controllers or provided to the respective controller(s) upon receipt of a data access request. Next, decision 186 evaluates host activity for issued data access requests and system policy operations that can be triggered by host activity. For instance, any data storage device controller of the distributed data storage system can identify low system resource consumption by one or more remote hosts and issue one or more policy operations in step 188 in response to the identified system status.

At least one policy operation may also be triggered by a data storage device controller in response to the detected addition, or removal, of data storage destinations, such as if a data storage device, or logical volume, was added or removed. It is noted that step 188 can be conducted without passing a command, or request, through the network controller(s) of the distributed data storage system and instead can involve different data storage devices, such as data storage devices resident in different data storage enclosures. In yet, some policy operations, such as data encryption and data updates, may involve communication with one or more remote hosts with communications that would merely pass through the respective upstream system controller(s) from a data storage device.

Although not required or limiting, a policy operation can involve generating one or more operations activities in step 188 that are necessary to produce change(s) to the data storage system in accordance with predetermined policy. For instance, wear mitigation policy may call for data to be moved between, or within, logical volumes of the same, or different, data storage devices based on number of accesses, which corresponds with step 188 calling for the identification of accesses to different physical locations of one or more data storage devices. As another policy example, garbage collection policy can be accommodated in step 188 by generating activities that identify stale data prior to moving the most recent version of data to a common location that fits with existing wear mitigation policy.

Step 188 may also generate activities to conform to host access to logical volume(s), the implementation of new data capacity, removal of data capacity, and changes in logical volume size. Hence, step 188 can intelligently generate activities that allow a distributed data storage system to conform to one or more predetermined policies concurrently, or sequentially. By allowing a data storage device controller to conduct the generation of operations activities in step 188, instead of having an upstream controller (enclosure/network) conduct such processing, the distributed data storage system can efficiently handle existing and new data access requests generated by the various connected remote hosts.

With the operations activities known, step 190 proceeds to generate a schedule in which those activities are carried out. The schedule of step 190 can be compiled by one or more data storage device controllers and subsequently executed by those controllers, as well as by other device controllers of the system, in step 192. That is, the device controller(s) that generates the operations activities in step 188 and/or the activities schedule in 190 may be different, or the same, which allows for level-loading of policy operations and servicing data access requests amongst the different device controllers of the distributed data storage system.

In the event host activity relates to issuing a data access request, decision 186 then determines if the request is for a data write (WRITE) or a data read (READ). If a host request is to read data stored in the distributed data storage system, step 194 correlates the logical block address (LBA) of the requested data to the actual location of the data in the distributed data storage system, which is characterized as a physical block address (PBA). Once the PBA of the requested data is located in step 194, step 196 retrieves the data with the data storage device controller of the device where the PBA(s) are located and sends the data stored in the PBA(s) to the requesting host.

In step 196, the retrieved data can pass through one or more upstream controllers, but such controllers are contemplated as dummy components that merely distribute data to a predetermined destination without conducting any processing. As such, servicing of data read requests can occupy minimal bandwidth of the upstream controllers.

If a data access request is to write data, step 198 initially assigns one or more PBAs and LBAs for the data provided by the host. The addresses (LBA/PBA) in step 198 can be assigned by a device controller after communication with other device controllers. The assigned addresses may be located in one or more logical volumes, data storage devices, and physical locations within the distributed data storage system. The device controller assigning addresses in step 198 can then set up the scheduling of data writing, which may involve sending the write data to a different data storage device.

Step 200 writes the data provided by the host to the PBA assigned in step 198 in accordance with a schedule established by the assigning device controller or established by the device controller of the PBA destination of the data, which may be the same device controller. In other words, the device controller assigning addresses in step 198 may be different than the device controller scheduling the writing of data, actually writing data in step 200, or returning a write receipt to the host in step 202.

It is noted that satisfying a data access request with steps 196 or 202 can trigger a policy operation, such as wear mitigation, garbage collection, or logical volume alteration, but such is not required. At the conclusion of steps 192, 196, or 202, routine 180 may terminate or return to decision 186 to await new data access requests and/or the triggering of policy operations. In accordance with some embodiments, routine 180 can be conducted by at least one device controller regardless of the presence and operation of upstream controllers.

Figure 6:
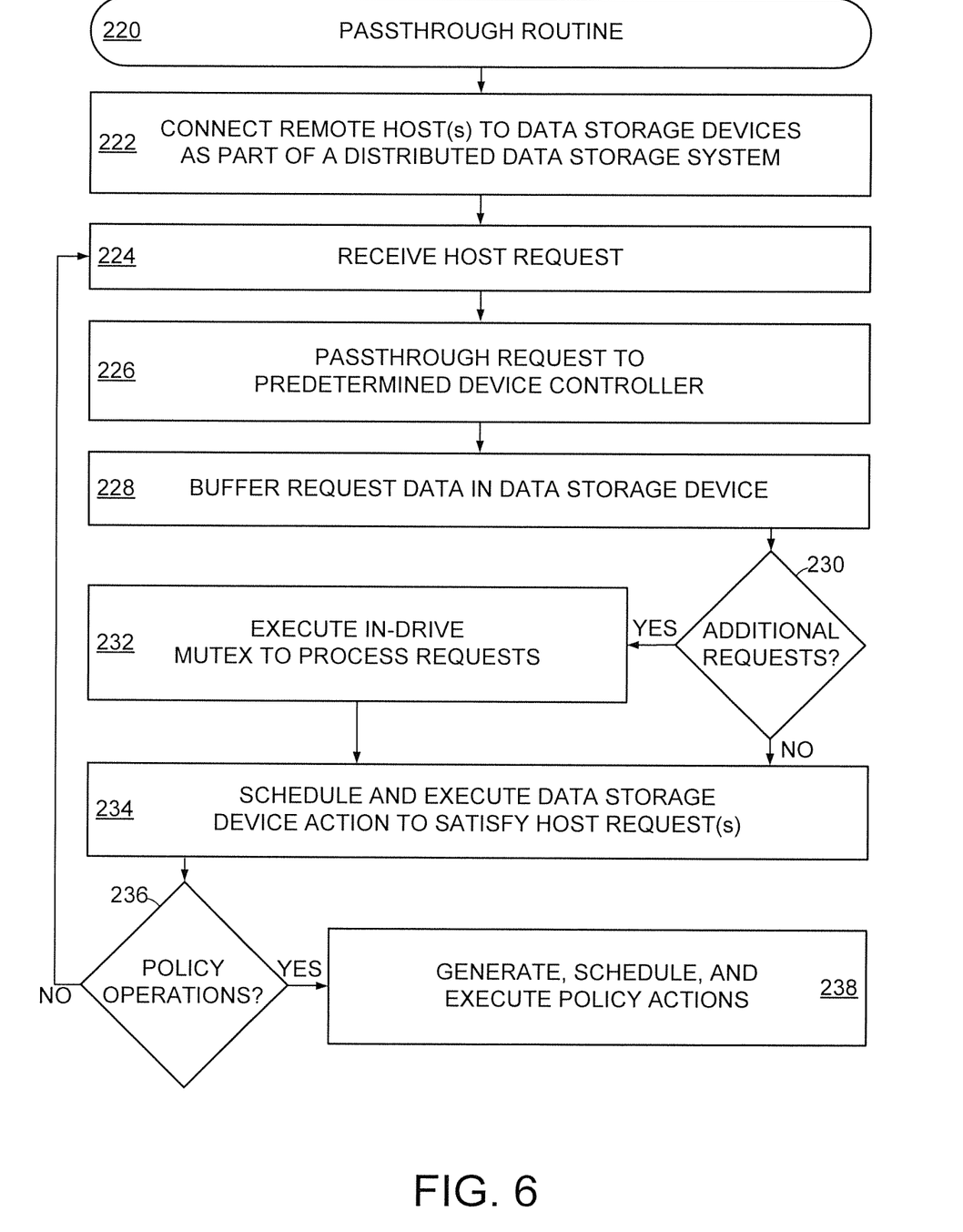
FIG. 6 conveys an example passthrough routine that may be carried out with the assorted embodiments of FIGS. 1-4.

The passthrough routine 220 shown in FIG. 6 conveys activities that can be carried out by upstream controllers as part of a distributed data storage system independently, or concurrently, with routine 180. The passthrough routine 220 begins with the interconnection of at least one remote host with at least one data storage device in step 222, as generally illustrated in FIGS. 1-4. A host request is received in step 224 by a network controller, which triggers step 226 to pass the request to a predetermined device controller without conducting request processing, such as encryption, address assignment, or destination assignment.

The host request, along with any associated data, is buffered in the data storage device by the predetermined device controller in step 228 while request processing occurs. The buffering of data in step 228 may occur in volatile or non-volatile memory of the predetermined data storage device while decision 230 awaits any additional requests, which may involve policy operations. Decision 230 can operate on a single data storage device or on the collective data storage devices while the destination data storage device for the request buffered in step 228 processes the request. That is, decision 230 can monitor new, and pending, data access requests to any data storage device in the distributed data storage system in order to harmonize the processing, scheduling, and servicing of all of the host requests.

The presence of more than one pending host request in a data storage device prompts step 232 to execute in-drive mutex to process the respective requests without conflict, error, or redundancy. The in-drive mutex allows for host requests to be serviced efficiently optimizing data access performance despite requests being received by multiple different remote hosts. In contrast, servicing of multiple different requests from a variety of different remote hosts by a network, or enclosure, controller can result in inefficiencies as requests are reconciled, assigned, and distributed to the diverse variety of logical volume and data storage device destinations.

At the conclusion of the in-drive mutex, or if no additional host requests are received in decision 230, step 234 schedules and then executes data storage device action(s) to satisfy the host request(s). Step 234 is conducted by one or more data storage device controllers to fulfill at least one data requests while other data requests, and/or policy operations, remain buffered and/or otherwise pending. Decision 236 evaluates if policy operations are called for by the servicing of host requests in step 234. If policy operations are due, decision 236 triggers step 238 to generate, schedule, and execute policy actions.

It is noted that decision 236 may coincide with decision 230 just as step 234 can occur concurrently with step 238. That is, the evaluation of pending, or triggered, policy operations can be conducted by one or more device controllers concurrently with the evaluation of incoming host requests and the execution of in-drive mutex. A lack of any pending or triggered policy operations from decision 236 returns routine 220 to step 224 where host requests are received by the distributed data storage system.

The various steps and decisions of routines 180 and 220 are not required or limiting. As such, any aspect of the routines 180/220 can be modified or removed just as any action can be newly added. For instance, an added decision can continuously, or sporadically, evaluate the data storage capacity of a distributed data storage system for changes in logical volumes or data capacity, which can be used at least by steps 234 and 238 in the scheduling and execution of host requests and policy actions.

Figure 7:
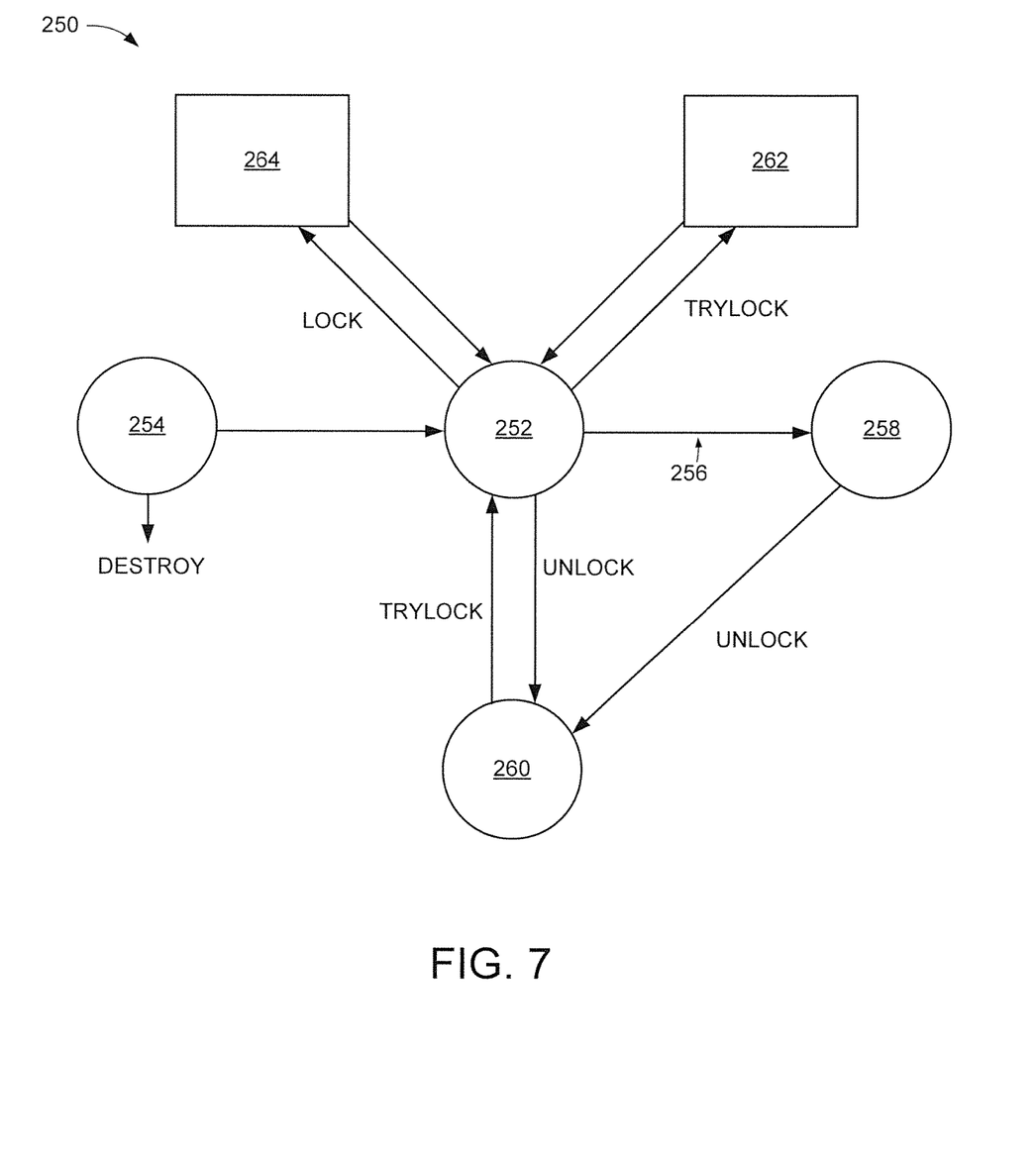
FIG. 7 depicts an example in-drive mutex that may be carried out with the distributed data storage systems of FIGS. 1-4.

FIG. 7 represents an example in-drive mutex 250 that can be conducted by a data storage device controller as part of a distributed data storage system in accordance with various embodiments. A data storage device 104 may contain one or more independent in-drive mutex 250 state machines. The state of any given in-drive mutex is persistent through reset and power cycle operations, even if the data storage device 104 is physically moved to a different enclosure. The in-drive mutex 250 allows loosely coupled network servers, and their corresponding network controllers, to be synchronized in a shared block level storage configuration. The mutex 250 receives a data access request and instead of simply queuing the request, the mutex 250 attempts to lock 252 the request by comparing the request to other requests pending in any of the data storage devices of a distributed data storage system.

In a locked state 252, a request can be scheduled for execution by a local device controller. A request may initially be in an unclaimed state 254 where the request has no designated destination, which may be indicative of a redundant request from the remote hosts of the system. While attempts to claim the unclaimed request can result in the request being locked 252, a device controller can selectively destroy the requests after a predetermined number of lock tries and/or a predetermined amount of time passing.

A request in a locked state 252 can also undergo a countdown 256 of a number of request servicing attempts and/or a predetermined countdown time. If a request survives the countdown 256, the request may be classified in an unlocked state 258 where the request is not queued for servicing, but instead buffered and being compared to other requests. Once a request is deemed to be unique and not in conflict with other requests, the request can be classified in the locked state 252. It is noted that a locked request may be unlocked upon discovery of a request redundancy, conflict, or error without going through the countdown 256.

It is contemplated that a request is claimed, meaning it has a designated destination, without being locked 252. In such circumstances, a request may be characterized as busy 262 and a device controller can continuously, or sporadically, attempt to lock the request by resolving any request discrepancies with other pending data access requests. A device controller may also recognize altered aspects of a data storage system with the add state 264 where a locked request is verified after a change in host, data storage device, and/or logical volume configuration.

As a result of the in-drive mutex 250 a device controller can organize multiple data access requests from different remote hosts and synchronize request servicing among different logical volumes, and data storage devices, so that data access performance for the system is optimized. The mutex 250 creates a barrier for system resource contention between network components and logical data volumes while allowing a device controller to modify access control for a request on-the-fly and after the request has been issued by a host and received by a data storage device.

Through the various embodiments of the present disclosure, the computing efficiency of data storage devices in a distributed data storage system can be utilized to optimize bandwidth of upstream network components. By passing data access requests through network components without conducting data processing, the downstream data storage devices can process, schedule, and execute data request actions as well as policy actions. The ability to conduct data access and policy actions with data storage devices, instead of with an upstream controller, allows for high data access performance despite numerous hosts connected to large numbers of logical volumes that can each have different policy and access criteria.

What is claimed is:

1. A method comprising:
    connecting a plurality of data storage devices to first and second hosts via a first network controller;
    receiving a first data access request from the first host with the first network controller, the first network controller capable of satisfying the first data access request;
    passing the first data access request to a predetermined data storage device of the plurality of data storage devices with the first network controller without acting on the first data access request with the first network controller;
    receiving a second data access request from the second host with the first network controller;
    passing the second data access request to a predetermined data storage device of the plurality of data storage devices with the first network controller without acting on or satisfying the second data access request with the first network controller;
    executing an in-drive mutex with a device controller of the predetermined data storage device on the first and second data access requests; and
    satisfying the first and second data access requests with the device controller of the predetermined data storage device.

2. The method of claim 1, wherein the in-drive mutex maintains the first and second data access requests in different states to prevent resource contention.

3. The method of claim 1, wherein the in-drive mutex modifies access control for at least one logical volume of at least one data storage device of the plurality of data storage devices.

4. The method of claim 1, wherein the in-drive mutex prevents request redundancy, conflict, and error between the first data access request and the second data access request.

5. The method of claim 1, wherein the first and second data access requests are passed through an enclosure controller to the predetermined data device without processing either data access request.

6. The method of claim 1, wherein a second network controller is connected to the plurality of data storage devices as part of a distributed network.

7. The method of claim 1, wherein the first network controller is a network server.

8. The method of claim 1, wherein a first data storage device and a second data storage device of the plurality of data storage devices are each housed in a first enclosure and a third data storage device and a fourth data storage device of the plurality of data storage devices are each housed in a second enclosure.

9. The method of claim 8, wherein the first and second enclosures are housed in different racks positioned in different cities.

10. The method of claim 1, wherein the predetermined data storage device has a peripheral component interconnect express (PCIe) bus employing a non-volatile memory express (NVMe) protocol, internet small computer systems interface (ISCSI) over Ethernet, NVMe over Infiniband, NVMe over Ethernet, and NVMe over OmniPath.

11. The method of claim 1, further comprising
    assigning a physical block address and a logical block address for a data block associated with the first data access request with the device controller of the predetermined data storage device.

12. The method of claim 1, wherein the network controller distributes the data access request to the predetermined data storage device without assigning a physical block address to the data block associated with the data access request.

13. The method of claim 1, wherein the network controller distributes the data access request to the predetermined data storage device without correlating a logical block address of the data access request with a physical block.

14. The method of claim 1, wherein the network controller acts as a dummy component.

15. The method of claim 1, wherein the device controller generates policy operation activities in response to the data access request.

16. The method of claim 15, wherein the policy operation activities comprise provisioning a logical volume of at least one data storage device of the plurality of data storage devices.

17. The method of claim 15, wherein the policy operation activities comprise garbage collection in at least one data storage device of the plurality of data storage devices.

18. The method of claim 15, wherein the policy operation activities comprise wear mitigation in at least one data storage device of the plurality of data storage devices.

19. The method of claim 15, wherein the device controller generates an operations schedule for the policy operation activities and subsequently directs execution of the policy operation activities.

* * * * *